United States Patent [19]
Deardurff et al.

[11] Patent Number: 5,788,754
[45] Date of Patent: Aug. 4, 1998

[54] INK-JET INKS FOR IMPROVED IMAGE QUALITY

[75] Inventors: Larrie A. Deardurff; Mary E. Austin; Hiang P. Lauw, all of Corvallis, Oreg.

[73] Assignee: Hewlett-Packard Company, Palo Alto, Calif.

[21] Appl. No.: 811,075

[22] Filed: Mar. 3, 1997

[51] Int. Cl.$^6$ ............................................. C09D 11/02
[52] U.S. Cl. ............................ 106/31.58; 106/31.57
[58] Field of Search ............................ 106/31.58, 31.59

[56] References Cited

U.S. PATENT DOCUMENTS

| | | | |
|---|---|---|---|
| 5,116,409 | 5/1992 | Moffatt | 106/31.57 |
| 5,141,599 | 8/1992 | Jahn et al. | 162/137 |
| 5,165,968 | 11/1992 | Johnson et al. | 106/31.58 |
| 5,207,824 | 5/1993 | Moffatt et al. | 106/31.58 |
| 5,364,461 | 11/1994 | Beach et al. | 106/31.58 |
| 5,501,725 | 3/1996 | Lauw et al. | 106/31.64 |
| 5,531,815 | 7/1996 | Gindlach et al. | 106/31.58 |
| 5,534,050 | 7/1996 | Gundlach | 106/31.49 |
| 5,536,306 | 7/1996 | Johnson et al. | 106/31.58 |
| 5,540,765 | 7/1996 | Gundlach et al. | 106/31.58 |

FOREIGN PATENT DOCUMENTS

| | | | |
|---|---|---|---|
| PCTGB9600262 | 8/1996 | WIPO | C09B 43/16 |
| PCTGB9600300 | 8/1996 | WIPO | C09B 43/16 |

*Primary Examiner*—Helene Klemanski
*Attorney, Agent, or Firm*—Soodabeh Tronson

[57] ABSTRACT

Thermal ink-jet inks are provided containing a colorant and a vehicle, the vehicle comprising from about 8 to about 20 wt % of a 1,2-diol, from about 0.1 to about 5 wt % of at least one non-ionic surfactant, and optionally 0 to about 5 wt. % of a aliphatic alcohol; 0 to about 1.5 wt % of at least one component independently selected from the group consisting of buffers, biocides, and metal chelators; and the balance water. The inks formulated according to the present invention provide the desired dot gain and dot symmetry on the print medium, in particular, gelatin coated media, while providing excellent color-to-color bleed alleviation. The images generated with the inks of the present invention exhibit excellent, near photographic image quality.

34 Claims, 5 Drawing Sheets

INK-JET INKS FOR IMPROVED IMAGE QUALITY

FIELD OF INVENTION

The present invention relates to ink compositions suitable for thermal ink-jet printing, and, more particularly, to ink compositions evidencing large dot gain, excellent dot symmetry, and color-to-color bleed alleviation, yielding high image quality.

BACKGROUND OF INVENTION

The use of ink-jet printing systems has grown dramatically in recent years. This growth may be attributed to substantial improvements in print resolution and overall print quality coupled with appreciable reduction in cost. Today's ink-jet printers offer acceptable print quality for many commercial, business, and household applications at costs fully an order of magnitude lower than comparable products available just a few years ago. Notwithstanding their recent success, intensive research and development efforts continue toward improving ink-jet print quality. In general, ink-jet print quality still falls short of that produced by more expensive technologies such as photography and offset or gravure printing. A surge in interest in ink-jet imaging (e.g., the rendition of pictures) has resulted in the need to produce near photographic quality printed images at a reasonable cost. The challenge remains to further improve the image quality of ink-jet printed images, without increasing their cost.

An ink-jet image is formed when a precise pattern of dots is ejected from a drop generating device known as a "printhead" onto a printing medium. The typical ink-jet printhead has an array of precisely formed nozzles located on a nozzle plate and attached to an ink-jet printhead substrate. The substrate incorporates an array of firing chambers that receive liquid ink (colorants dissolved or dispersed in a solvent) through fluid communication with one or more ink reservoirs. Each chamber has a thin-film resistor, known as a "firing resistor," located opposite the nozzle so ink can collect between the firing resistor and the nozzle. In particular, each resistor element, which is typically a pad of a resistive material, measures about 35 µm×35 µm. The printhead is held and protected by an outer packaging referred to as a print cartridge, i.e., ink-jet pen.

Upon energizing of a particular resistor element, a droplet of ink is expelled through the nozzle toward the print medium, whether paper, transparent film, or the like. The firing of ink droplets is typically under the control of a microprocessor, the signals of which are conveyed by electrical traces to the resistor elements, thereby forming alphanumeric and other characters on the print medium.

The tight tolerances of the nozzles, typically 30 to 40 µm diameter require that the ink not clog the nozzles. Further, repeated firings of the resistor elements which must withstand many millions of firings over the life of the ink cartridge to be commercially practical, can result in fouling of the resistor elements and degrading pen performance. This build up of residue on the resistor elements is unique to ink-jet printers and is known as kogation and defined as the build-up of residue (koga) on the resistor surface.

In general, a successful ink for color ink-jet printing must be compatible with the ink-jet pen and printing system. Some of the required properties for the ink-jet ink include: good crusting resistance, the proper viscosity, the proper surface tension, little color-to-color bleed, rapid dry time, consumer safety, low strike through, and good dot gain (the amount a single ink drop spreads when it hits the media). Furthermore, the ink must be stable over the normal operating and storage temperatures.

The ink must be capable of interacting with the print medium, to spread on the paper and to produce dots having good symmetry while exhibiting excellent color-to-color bleed alleviation. The amount of dot gain (dot spread) is critical to the production of prints with high image quality. Dot gain must be sufficient to cover the pixel onto which the ink drop is ejected. This dot gain is necessary for hiding of the unwanted white of the print medium and the printing defects that may occur due to the normal variations in performance of the ink-jet print system, such as misaligned drop trajectory, and non-firing nozzles. This hiding power can be increased as more ink drops are placed onto a single pixel. However, the use of multiple drops must be balanced against the absorption capacity of the print medium, cost per page (more ink drops lead to more ink consumption), and print system's throughput (if drops have to be placed on the same pixel in the course of several print passes, the throughput is decreased). Therefore, it is necessary to have sufficient dot gain with less number of ink drops.

The use of organic solvents, specifically diols, in aqueous ink-jet inks is known, as described in U.S. Pat. No. 5,536,306 by Johnson et al., issued Jul. 16, 1996, and U.S. Pat. No. 5,207,824 by Moffat et al., issued May 4, 1993; both assigned to the assignee of the present invention. However, neither patent teaches the use of 1,2 diols, specifically 1,2-hexanediol. Furthermore, Moffat requires the use of at least 15 wt % of an "anti-cockle" agent (i.e., a compound having from four to eight carbon atoms and from two to three OH groups). In addition, Moffat employs the use of a variety of surfactants, e.g., anionic or non-ionic, as long as the surfactants are present in concentrations above their critical micelle concentration in order to attract the dye molecule, thus controlling the color bleed.

U.S. Pat. No. 5,364,461 by Beach, issued Nov. 15, 1994, describes and claims the use of 1,2-diols, specifically 1,2-hexanediol, and 1,2-pentanediol. However, Beach specifically excludes the use of surfactants in its formulation, particularly surfactants that are present in an amount exceeding the critical micelle concentration. Furthermore, Beach states that primary alcohols such as n-butanol should be avoided in formulating the inks. Furthermore, the only example presented in Beach teaches the use of 1,2-hexanediol at a minimum concentration of 2.5 wt %.

Inks are known which possess one or more of the foregoing properties. However, few inks are known that possess all the foregoing properties, since an improvement in one property often results in the degradation of another property. Thus, many inks used commercially represent a compromise in an attempt to achieve an ink evidencing at least an adequate response in each of the foregoing considerations. Accordingly, investigations continue into developing ink formulations which have improved properties and which do not improve one property at the expense of the others. Thus, challenge remains to further improve the image quality of the ink-jet prints without sacrificing pen performance and reliability.

DISCLOSURE OF THE INVENTION

In accordance with the invention, thermal ink-jet inks are provided containing a colorant and a vehicle, the vehicle comprising from about 8 to about 20 wt % 1,2-diol, from about 0.1 to about 5 wt % of at least one non-ionic surfactant, and optionally 0 to about 5 wt. % of an aliphatic alcohol; 0 to about 1.5 wt % of at least one component independently selected from the group consisting of buffers, biocides, and metal chelators; and the balance water.

The inks formulated according to the present invention provide the desired dot gain and dot symmetry on the print medium, in particular, gelatin coated media, while providing excellent color-to-color bleed alleviation. The images generated with the inks of the present invention exhibit excellent, near photographic image quality.

DETAILED DESCRIPTION OF THE INVENTION

Figure 1A:
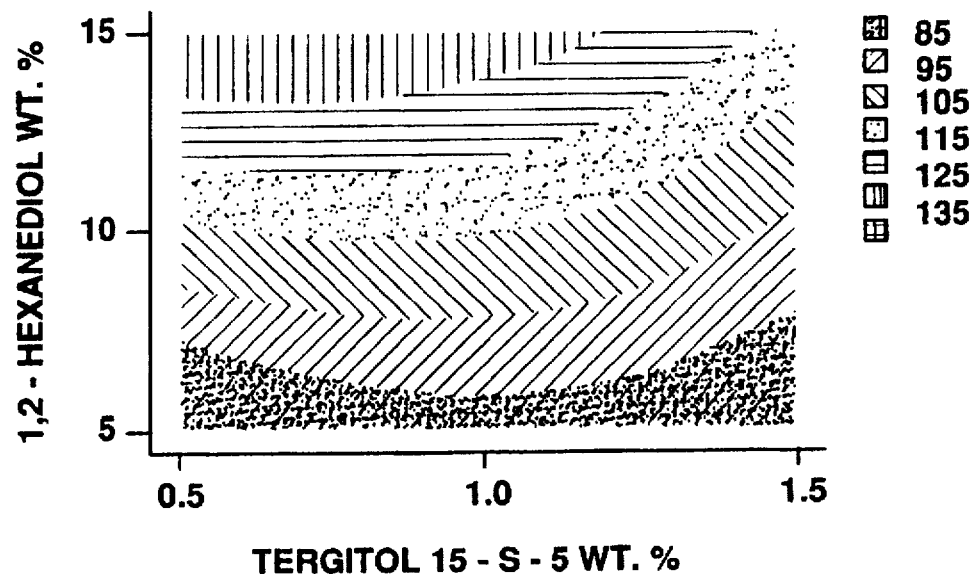
FIG. 1a is a contour plot of concentrations for 1,2-hexanediol versus Tergitol 15-S-5 for inks of this invention compared to other inks, depicting the synergistic effect of 1,2-hexanediol and Tergitol 15-S-5 on dot size.

The invention described herein is directed to thermal ink-jet inks for printing ink-jet images using commercially available ink-jet printers such as DESKJET® printers, manufactured by Hewlett-Packard Company, of Palo Alto, Calif. The inks enable the printed dots to (1) spread to sufficiently large diameters necessary for coverage of image pixels, (2) exhibit excellent dot symmetry, and (3) exhibit little or no color-to-color bleed, on a range of print media, in particular, gelatin coated ink-jet media.

The inks of the present invention comprise a colorant and a vehicle, the vehicle comprising from about 8 to about 20 wt % 1,2-diol, from about 0.1 to about 5 wt % of at least one non-ionic surfactant, and optionally 0 to about 5 wt. % of an aliphatic alcohol; 0 to about 1.5 wt % of at least one component independently selected from the group consisting of buffers, biocides, and metal chelators; and the balance water.

The inks formulated according to the present invention provide the desired dot gain, dot symmetry, and color-to-color bleed alleviation on the print media, in particular, gelatin coated ink-jet media. The images generated with the inks of the present invention exhibit excellent, near photographic image quality.

Gelatin coated ink-jet media, typically comprise a polyethylene-coated substrate or paper support with a gelatin coating thereon. Gelatin coated ink-jet media have been described in patents such as U.S. Pat. No. 5,141,599 by Reiner et al., issued Aug. 25, 1992 and assigned to Felix Schoeller Company. German patent application DE 196 18 607.2 entitled "Recording Material for Ink-Jet Printing" ("Aufzeichnungsmaterial für Tintenstrahl-Druckverfahren") by Gerhard Dransmann et al., filed on May 9, 1996, assigned to Felix Schoeller Company, and incorporated herein by reference, describes a recording material for ink-jet printing comprising a paper support, a receiving layer, and a top layer coated on the receiving layer. The receiving layer comprises gelatin. The top coating comprises either or both fine porous pigments and filler particles, and a binder such as polyvinyl alcohol or modified polyvinyl alcohol.

All concentrations herein are in weight percent of total ink composition, unless otherwise indicated. The purity of all components is that employed in normal commercial practice for ink-jet inks.

ORGANIC SOLVENT

The organic solvents employed in the present invention are selected from a group consisting of 1,2-hexanediol, 1,2-pentanediol, and mixtures thereof. The preferred diol is 1,2-hexanediol. The organic solvent is present at a concentration from about 8 to about 20 wt %, more preferably, from about 8 to about 13 wt %, with a concentration of about 9 to about 11 wt % being the most preferred.

Other 1,2-diols would not be suitable in the practice of the invention. For example, 1,2-butanediol and 1,5-pentanediol were found not to have the desired dot gain properties (see Table 1 below), and 1,2-heptanediol is not readily available. 1,2-Octanediol is not as water soluble as 1,2-hexanediol, requiring it to be added only at a concentration of 2 to 5 wt %, thus not being a very suitable solvent.

The concentration of 1,2-hexanediol was also found to be critical in producing the desired dot gain. The dot size, coalescence, color-to-color bleed alleviation, and image quality were dependent on the synergy between the concentrations of 1,2-hexanediol and the surfactant.

SURFACTANT

In the practice of the invention, one or more non-ionic surfactants, such as secondary alcohol ethoxylates (e.g., Tergitol series available from Union Carbide Co.), non-ionic fluoro surfactants (such as FC170C available from 3M), non-ionic fatty acid ethoxylate surfactants (e.g., Alkamul PSMO-20 available from Rhone-Poulenc), and fatty amide ethoxylate surfactants (e.g., Aldamide L203 available from Rhone-Poulenc), are necessary to provide the balance between dot gain and color-to-color bleed alleviation (see Table 2 below) on plain paper, coated paper, and in particular gelatin coated media optimized to provide the desired dot gain and ink absorption capacity. It was found that ionic surfactants, such as Dowfax (an anionic surfactant) and FC99 (an anionic fluorosurfactant), did not provide the necessary dot gain and bleed control.

In the practice of the invention, secondary alcohol ethoxylates commercially available, for example, from Union Carbide Co. (Houston, Tex.) as the Tergitol series, are preferred. Tergitol 15-S-5 and Tergitol 15-S-7 are more preferred, with Tergitol 15-S-5 being the most preferred surfactant.

The secondary alcohol ethoxylates contain (a) an aliphatic chain having a prescribed number of carbon atoms in the chain, and (b) a prescribed number of ethoxylated units. These ethoxylates are commercially available as mixtures of ethoxylates, and so are described in terms of the predominance of a given compound. Secondary alcohol ethoxylates suitably employed in the practice of the invention predominantly have from about 12 to about 18 carbon atoms in the aliphatic chain, while the number of ethoxylated units is predominantly in the range of from about 4 to about 8 units. Thus, "Tergitol 15-S-5" represents a secondary alcohol ethoxylate surfactant predominantly having about 15 carbons in its aliphatic chain and about 5 ethoxylated units.

The inks of the present invention comprise from about 0.1 to about 5 wt % surfactant. More preferably, the inks comprise from about 0.5 to about 1.5 wt % surfactant, with a concentration from about 0.8 to about 1.5 wt % being the most preferred.

ALCOHOL

Aliphatic alcohols comprising 3 to 5 carbon atoms may optionally be used in the practice of the invention. Examples of such alcohols include butanol, propanol, pentanol, and mixtures thereof. It was found that the addition of the alcohol improved dot gain and image quality (see Table 4 below). In the practice of the invention n-butanol is preferred. The inks of the present invention comprise 0 to about 5 wt % alcohol. More preferably, the inks comprise from about 1 to about 5 wt % alcohol, with a concentration from about 1.5 to about 2.5 wt % being the most preferred.

OTHER INGREDIENTS

The inks of the present invention may optionally comprise components such as buffers, metal chelators, and biocides.

BUFFERS

Buffers optionally employed in the practice of the invention to modulate pH can be organic-based biological buffers or inorganic buffers, preferably, organic-based. Further, the buffers employed should provide a pH ranging from about 3 to about 9 in the practice of the invention, preferably about 6.5 to about 8 and most preferably from about 6.7 to 7.1. Examples of preferably-employed buffers include Trizma Base, available from companies such as Aldrich Chemical (Milwaukee, Wis.), 4-morpholineethanesulfonic acid (MES), and 4-morpholinepropanesulfonic acid (MOPS). Most preferably, MES is employed in the practice of the invention.

The inks of the present invention optionally comprise 0 to about 1.5 wt % buffer. More preferably, the inks comprise from about 0.1 to about 0.5 wt % buffer, with a concentration from about 0.1 to about 0.3 wt % being the most preferred.

METAL CHELATOR

Metal chelators optionally employed in the practice of the invention are used to bind transition metal cations that may be present in the ink. Examples of preferably-employed metal chelators include: Ethylenediaminetetraacetic acid (EDTA), Diethylenetriaminepentaacetic acid (DTPA), trans-1,2-diaminocyclohexanetetraacetic acid (CDTA), (ethylenedioxy) diethylenedinitrilotetraacetic acid (EGTA), or other chelators that can bind transition metal actions. More preferably, EDTA, and DTPA, and most preferably, EDTA in its disodium salt form is employed in the practice of the invention.

The inks of the present invention optionally comprise 0 to about 1.5 wt % metal chelator. More preferably, the inks comprise from about 0.1 to about 0.5 wt % metal chelator, with a concentration from about 0.1 to about 0.3 wt % being the most preferred.

BIOCIDE

Any of the biocides commonly employed in ink-jet inks may optionally be employed in the practice of the invention, such as Nuosept 95, available from Huls America (Piscataway, N.J.); Proxel GXL, available from Zeneca (Wilmington, Del.); and glutaraldehyde, available from Union Carbide Company (Bound Brook, N.J.) under the trade designation Ucarcide 250. Proxel GXL is the preferred biocide.

The inks of the present invention optionally comprise 0 to about 1.5 wt % biocide. More preferably, the inks comprise from about 0.1 to about 0.5 wt % biocide, with a concentration from about 0.1 to about 0.3 wt % being the most preferred.

COLORANTS

The amount of dye added to the vehicle in prior compositions and the inventive compositions tend to be a function of choice, and is largely dependent upon solubility of the dye in the vehicle and the color intensity of the dye. Typical amounts of dye are between about 0.1 wt. % to about 5 wt. % of ink composition. In compositions of the invention, the dye is preferably colored rather than black, although any of the dyes used in inks for ink-jet printers may be employed. Illustrative suitable dyes include Direct Blue 199 (available form Zeneca Colors as Projet Cyan Special), Direct Red 9, Direct Red 227, Magenta 377 (available from Ilford AG, Rue de l'Industrie, CH-1700 Fribourg, Switzerland), Acid Yellow 23, Direct Yellow 86, Yellow 104 (Ilford AG), Direct Yellow 4 (BASF), Yellow PJY H-3RNA (Zeneca Colors), and Direct Yellow 50 (Zenceca Colors). More preferably, Direct Blue 199, Magenta 377, and Ilford Yellow 104 are employed as the cyan, magenta, and the yellow colorants.

INDUSTRIAL APPLICABILITY

The ink formulations are expected to find use in thermal ink-jet printing applications to increase dot gain while maintaining excellent color-to-color bleed alleviation, particularly when using gelatin coated media.

EXAMPLES

Inks were formulated and different qualities of the formulated inks were measured in an effort to assess the benefits attained in the practice of the invention, namely, dot gain, dot shape, color-to-color bleed, and stability. Print samples of formulated inks, where necessary, were generated using a Hewlett-Packard DeskJet® printer.

METHOD OF MEASUREMENT FOR IMAGE QUALITY

Print quality was evaluated by measuring at least one attribute, such as dot gain (the amount a single ink droplet spreads when it hits the media), dot shape, color-to-color bleed, and overall image quality.

To evaluate dot size, dots were placed on the gelatin coated ink-jet media by either (A) ejecting single dots from a Hewlett-Packard DeskJet® Printer, or (B) placing a 10 µl aliquot. Dot size was measured by measuring the dot diameter under the microscope. The desired dot size was 120 µm. Lower dot sizes led to images having inferior quality due to either or both insufficient covering of the pixels and lack of hiding power for the printing defects such as mis-fired nozzles. Larger dot sizes exhibited blurry and ill-defined images.

Dot shape was evaluated visually under the microscope for symmetry and edge acuity. It is desired that the dots exhibit good symmetry and well-defined edges.

Color-to-color bleed was evaluated by printing blocks of differing colors, adjacent one another, and thereafter visually inspecting the printed images for the unwanted migration of color from one block to another. It is desired that the printed images have high bleed alleviation (i.e., none or little color-to-color bleed).

Coalescence and overall image quality were evaluated by printing images (containing pictures) using the formulations described in Examples below and thereafter evaluating the images for coalescence and overall image quality. Attributes affecting overall image quality include, but are not limited to, color quality, dot spread, dot gain, color-to-color bleed, and coalescence. It is desired that the printed images have high coalescence alleviation (i.e., little or not coalescence), and high image quality.

METHOD OF MEASUREMENT FOR INK STABILITY

Ink stability was evaluated by measuring the cloud point of the ink (temperature at which the ink separates into more than one phase). Inks were heated to their respective cloud points or boiling points, whichever occured first. Some inks, exhibited cloud points at room temperature (r.t.) in which case no boiling was necessary. It is desired that the inks do no exhibit any cloud point, i.e., no phase separation even after reaching their respective boiling points.

Example 1

EFFECT OF 1,2-HEXANEDIOL

A series of inks were prepared in which each ink had the following standard components, in addition to those listed in Table 1. The inks were then evaluated for dot size, image quality, and cloud point. Dots were generated using dot generating method "A" above.

| standard components | |
|---|---|
| buffer | 0.2% MES |
| metal chelator | 0.2% EDTA |
| biocide | 0.2% Proxel GXL |
| surfactant | 1.0% Tergitol 15S-5 |
| Magenta 377 | 0.07 absorbance at lambda$_{max}$ 518 nm for 1:10,000 dilution |
| balance | water |

TABLE 1

| INK ID | SOLVENT | DOT SIZE (μm) | IMAGE QUALITY | CLOUD POINT |
|---|---|---|---|---|
| control | 10% 1,2-hexanediol + 2% n-butanol | 120 | control | none |
| 1-1 | 10% 1,5-pentanediol + 2% n-butanol | n.m. | less than control | r.t. |
| 1-2 | 10% 1,2-butanediol + 2% n-butanol | 90 | less than control | <60° C. |
| 1-3 | 10% 1,2-pentanediol + 2% iso-butanol | 128 | less than control (unsymmetrical dot shape, some coalescence) | <60° C. |
| 1-4 | 10% 1,2-hexanediol + 2% iso-butanol | 128 | same as control | none |
| 1-5 | 10% 1,6-hexanediol + 2% iso-butanol | ~80 | less than control | r.t. | n.m. = not measured

As can be noted, only inks containing 1,2-hexanediol provided the desired dot gain and dot shape.

Example 2

EFFECT OF SURFACTANT

A series of inks were prepared, each series comprising 3 inks of differing hues, namely, cyan, yellow, and magenta. All inks had the following standard components, in addition to those listed in Table 2. The inks were then evaluated for color-to-color bleed alleviation and image quality. Dots were generated using dot generating method "B" above for the magenta ink.

| standard components | |
|---|---|
| buffer | 0.2% MBS |
| metal chelator | 0.2% EDTA |
| biocide | 0.2% Proxel GXL |
| diol | 10% 1,2-hexanediol |
| balance | water |
| dyes for the corresponding ink colors | |
| cyan - DB199 | 0.09 absorbance at lambda$_{max}$ 618 nm for 1:10,000 dilution |
| yellow - Y104 | 0.07 absorbance at lambda$_{max}$ 402 nm for 1:10,000 dilution |
| magenta - M377 | 0.07 absorbance at lambda$_{max}$ 518 nm for 1:10,000 dilution |

TABLE 2

| INK ID | ALCOHOL | SURFACTANT | DOT SIZE (mm) | BLEED ALLEVIATION | IMAGE QUALITY | CLOUD-POINT |
|---|---|---|---|---|---|---|
| control | 2% n-butanol | 1% Tergitol 15-S-5 | 6.9 | control | control | none |
| 2-1 | 2% n-butanol | — | 6.1 | less than control | less than control | n.m. |
| 2-2 | 2% n-butanol | 1% FC170C | 7.1 | n.m. | n.m. | n.m. |
| 2-3 | — | 1% FC170C | 7 | n.m. | n.m. | none |
| 2-4 | 2% n-butanol | 1% Alkamul PSMO-20 | 7 | n.m. | n.m. | n.m. |
| 2-5 | 2% n-butanol | 1% Alkamide L-203 | 8 | n.m. | n.m. | n.m. |
| 2-6 | — | 1% Dowfax | 5 | less than control | less than control | none |
| 2-7 | — | Dowfax 1% + 1% FC99 | 5 | less than control | less than control | n.m. |
| 2-8 | 2% n-butanol | 1% Tergitol 15-S-3 | n.m. | same as control | less than control (irregular dot shape) | <60° C. |
| 2-9 | 2% n-butanol | 1% Tergitol 15-S-7 | n.m. | less than control | less than control (coalescence) | none | n.m. = not measured

FC 170C; Tergitol 15-S-5; and Alkamul PSMO-20 (a fatty acid ethoxylate surfactant) and Aldamide L203 (a fatty amide ethoxylate surfactant); are non-ionic surfactants, available from 3M; Union Carbide Co.; and Rhone-Poulenc, respectively. Dowfax and FC99 are anionic surfactants, available from Dow Chemical and Union Carbide, respectively.

As can be noted from the data in Table 2, only inks containing both 1,2-hexanediol and non-ionic surfactant, specifically, Tergitol 15-S-5 has sufficient dot gain, excellent dot symmetry and color-to-color bleed alleviation, necessary for photographic image quality, while demonstrating no cloud point.

Example 3

EFFECT OF 1,2-HEXANEDIOL CONCENTRATION

Figure 1B:
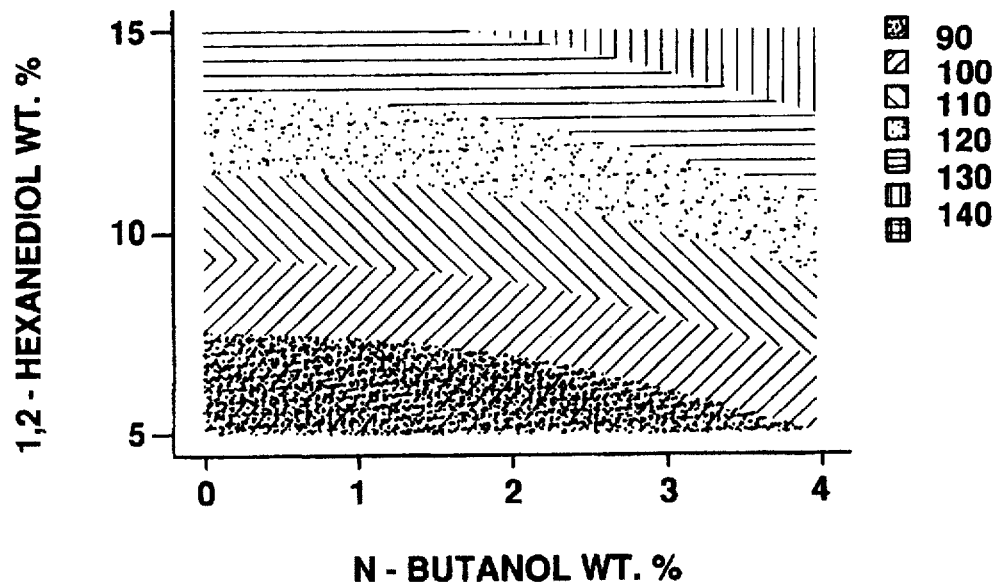
FIG. 1b is a contour plot of concentrations for 1,2-hexanediol versus n-butanol for inks of this invention compared to other inks, depicting the synergistic effect of 1,2-hexanediol and n-butanol on dot size.
Figure 1C:
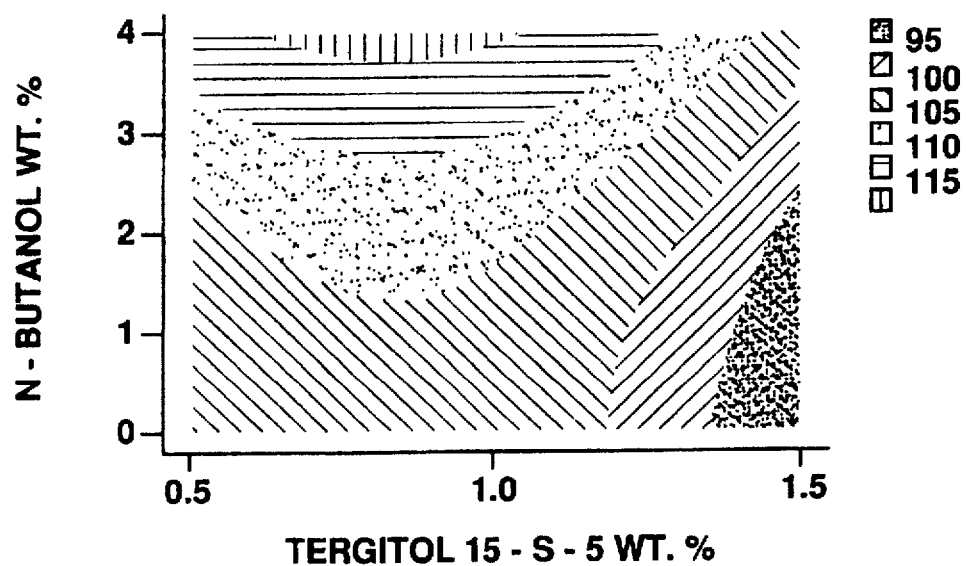
FIG. 1c is a contour plot of concentrations for n-butanol versus Tergitol 15-S-5 for inks of this invention compared to other inks, depicting the synergistic effect of n-butanol and Tergitol 15-S-5 on dot size.

A series of inks were prepared, each series comprising 3 inks of differing hues, namely, cyan, yellow, and magenta. All inks had the following standard components, with varying concentration of 1,2-hexanediol, Tergitol 15-S-5, and n-butanol. The inks were evaluated for dot size, coalescence, and image quality. Dots were generated using dot generating method "A" above for the magenta inks. The results for dot size, coalescence, and overall image quality are represented in FIGS. 1(a), 1(b), 1(c); 2(a), 2(b), 2(c); and 3(a), 3(b), 3(c); respectively.

| standard components | |
|---|---|
| buffer | 0.2% MES |
| metal chelator | 0.2% EDTA |
| biocide | 0.2% Proxel GXL |
| balance | water |
| dyes for the corresponding ink colors | |
| cyan - DB199 | 0.09 absorbance at lambda$_{max}$ 618 nm for 1:10,000 dilution |
| yellow - Y104 | 0.07 absorbance at lambda$_{max}$ 402 nm for 1:10,000 dilution |
| magenta - M377 | 0.07 absorbance at lambda$_{max}$ 518 nm for 1:10,000 dilution |

Figure 2A:
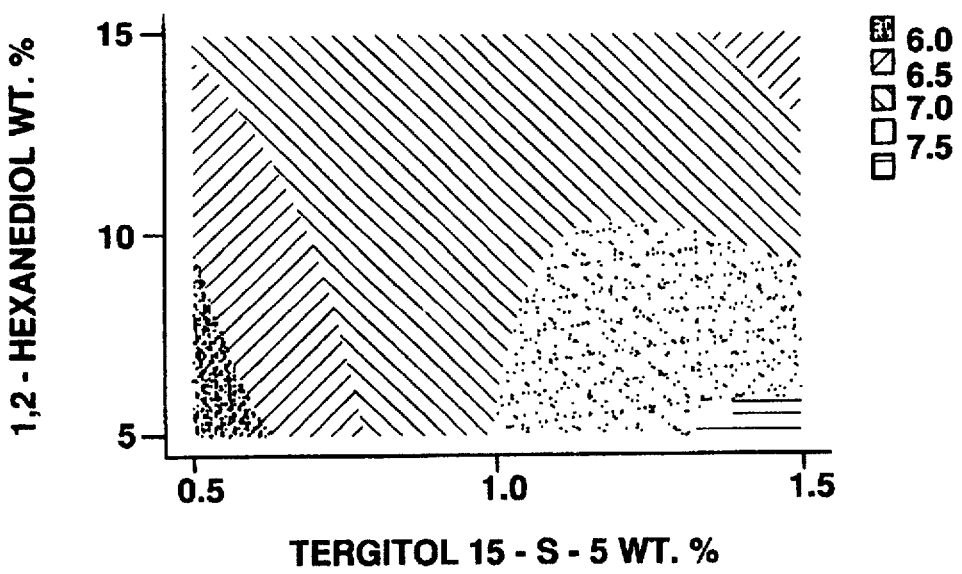
FIG. 2a is a contour plot of concentrations for 1,2-hexanediol versus Tergitol 15-S-5 for inks of this invention compared to other inks, depicting the synergistic effect of 1,2-hexanediol and Tergitol 15-S-5 on coalescence alleviation. Higher scores indicate less coalescence.
Figure 2B:
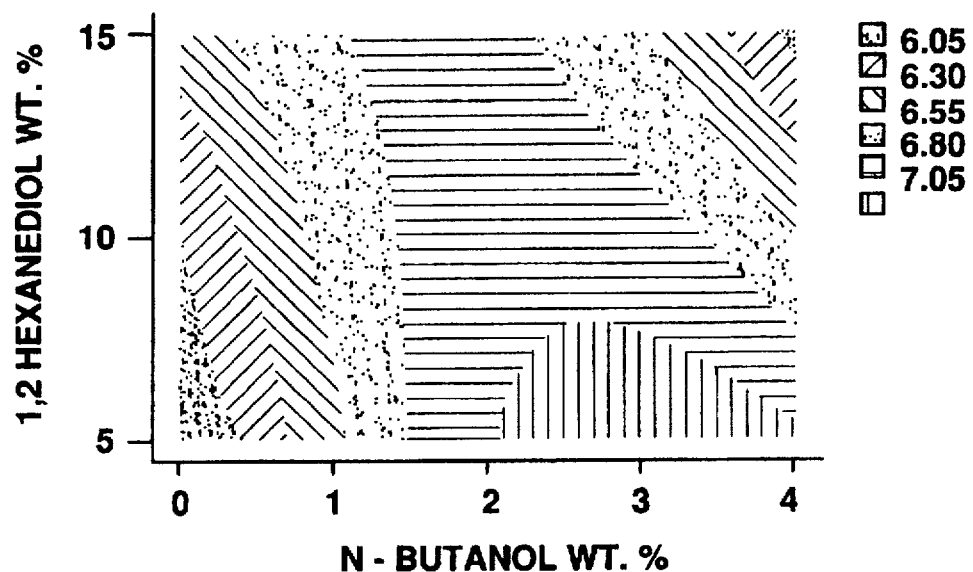
FIG. 2b is a contour plot of concentrations for 1,2-hexanediol versus n-butanol for inks of this invention compared to other inks, depicting the synergistic effect of 1,2-hexanediol and n-butanol on coalescence alleviation. Higher scores indicate less coalescence.
Figure 2C:
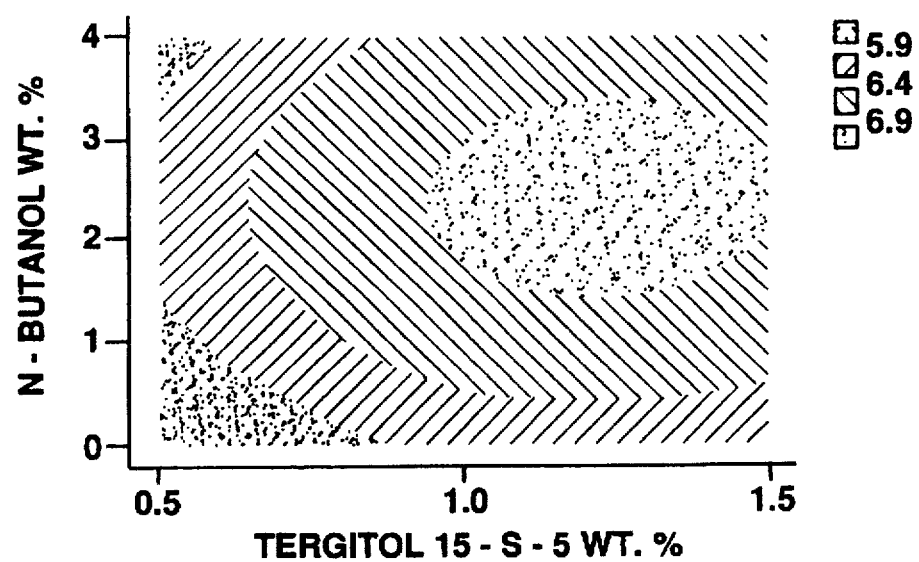
FIG. 2c is a contour plot of concentrations for n-butanol versus Tergitol 15-S-5 for inks of this invention compared to other inks, depicting the synergistic effect of n-butanol and Tergitol 15-S-5 on coalescence alleviation. Higher scores indicate less coalescence.
Figure 3A:
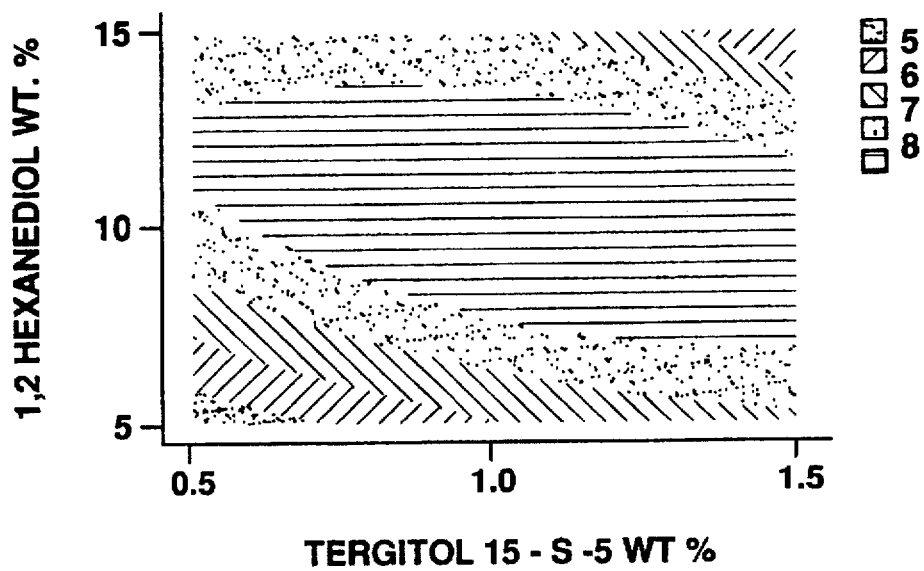
FIG. 3a is a contour plot of concentrations for 1,2-hexanediol versus Tergitol 15-S-5 for inks of this invention compared to other inks, depicting the synergistic effect of 1,2-hexanediol and Tergitol 15-S-5 on image quality. Higher scores indicate better image quality.
Figure 3B:
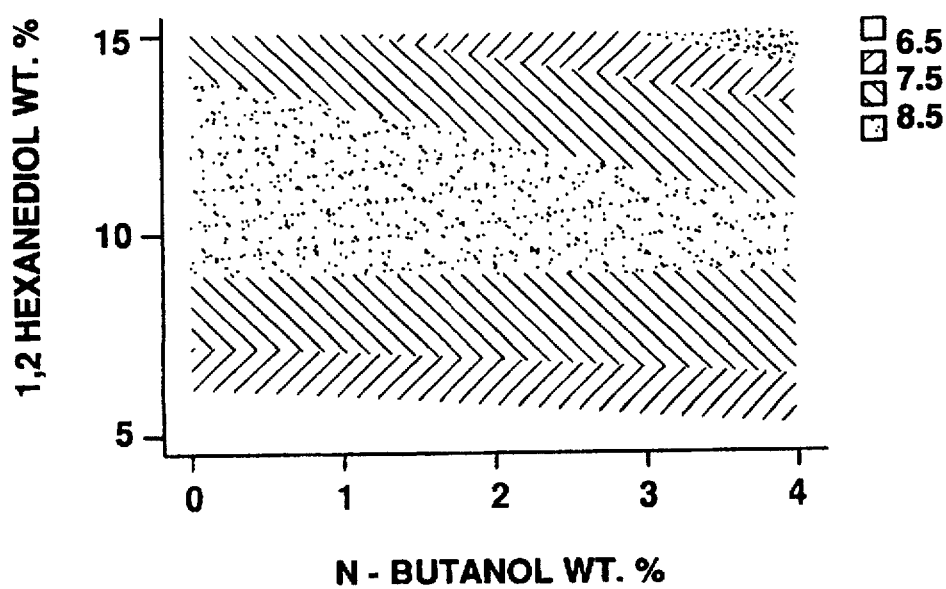
FIG. 3b is a contour plot of concentrations for 1,2-hexanediol versus n-butanol for inks of this invention compared to other inks, depicting the synergistic effect of 1,2-hexanediol and n-butanol on image quality. Higher scores indicate better image quality.
Figure 3C:
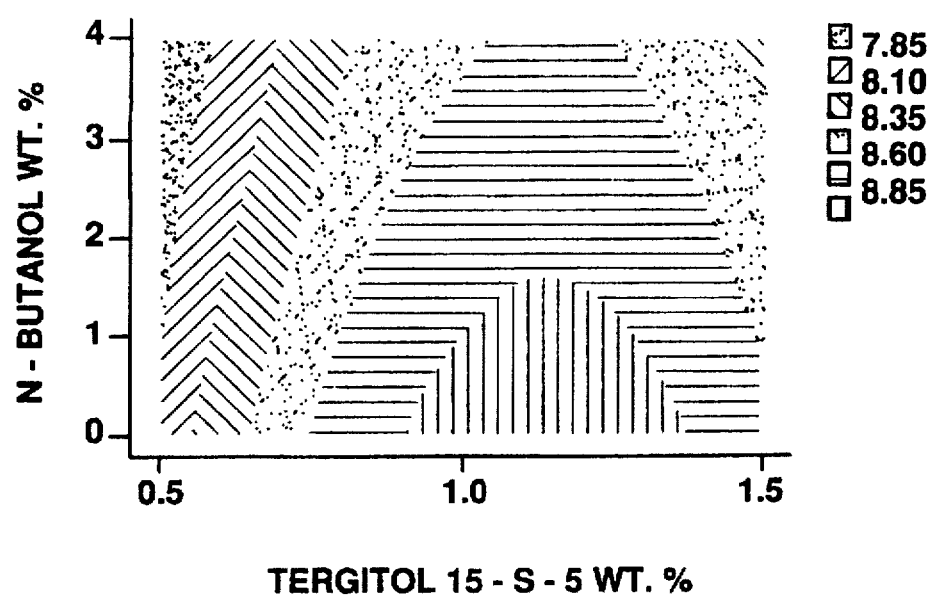
FIG. 3c is a contour plot of concentrations for n-butanol versus Tergitol 15-S-5 for inks of this invention compared to other inks, depicting the synergistic effect of n-butanol and Tergitol 15-S-5 on image quality. Higher scores indicate better image quality.

It was desirable to have (1) dot size in the range from about 110 to 120 μm, (2) excellent coalescence alleviation (i.e., little or no coalescence—the higher numbers in FIGS. 2(a), 2(b), and 2(c), represent higher coalescence alleviation, thus less coalescence), and (3) high image quality. As can be noted, the concentration of 1,2-hexanediol was critical in obtaining sufficient dot gain, high coalescence alleviation and good image quality (e.g., little or no color-to-color bleed, dots with good symmetry and well defined edges).

Example 4

EFFECT OF ALCOHOL

A series of inks were prepared, each series comprising 3 inks of differing hues, namely, cyan, yellow, and magenta. All inks had the following standard components, in addition to those listed in Table 3. The inks were evaluated for dot size and image quality. Dots were generated using dot generating method "A", above for the magenta inks.

| standard components | |
|---|---|
| buffer | 0.2% MES |
| metal chelator | 0.2% EDTA |
| biocide | 0.2% Proxel GXL |
| diol | 10% 1,2-hexanediol |
| surfactant | 1% Tergitol 15-S-5 |
| balance | water |
| dyes for the corresponding ink color | |
| cyan - DB199 | 0.09 absorbance at lambda$_{max}$ 618 nm for 1:10,000 dilution |
| yellow - Y104 | 0.07 absorbance at lambda$_{max}$ 402 nm for 1:10,000 dilution |
| magenta - M377 | 0.07 absorbance at lambda$_{max}$ 518 nm for 1:10,000 dilution |

TABLE 3

| INK ID | ALCOHOL | DOT SIZE (mm) | IMAGE QUALITY | REMARKS |
|---|---|---|---|---|
| control | 2% n-butanol | 120 | control | control |
| 4-1 | — | 110 | same as control @ ambient | image quality not as robust as the control at different environmental conditions |
| 4-2 | 1% n- | 115 | same as control | image quality not as |

TABLE 3-continued

| INK ID | ALCOHOL | DOT SIZE (mm) | IMAGE QUALITY | REMARKS |
|---|---|---|---|---|
| | butanol | | @ ambient | robust as the control at different environmental conditions |
| 4-3 | 3% n-butanol | 130 | less than control (blurry images) | — |
| 4-5 | 2% n-propanol | 100 | less than control (white spots, banding) | — |
| 4-6 | 2% n-pentanol | 138 | less than control (unsymmetrical dots, blurry images) | — |
| 4-7 | 1% n-pentanol | 128 | less than control (unsymmetrical dots) | — |

As can be noted from the data in Table 3, addition of n-butanol enhanced the dot gain and dot symmetry.

Thus, it has been demonstrated that inks formulated according to the present invention provide near photographic image quality by controlling dot size, dot shape, and color-to-color bleed.

What is claimed is:

1. An ink-jet ink for ink-jet printing, comprising:
   about 8 to about 20 wt % of a diol, said diol selected from the group consisting of 1,2-pentanediol, 1,2-hexanediol, and mixtures thereof;
   about 0.1 to about 5 wt % of at least one non-ionic surfactant;
   0 to about 5 wt % of at least one alcohol independently selected from the group consisting of propanol, butanol, pentanol, hexanol, and isomers thereof;
   0 to about 1.5 wt % of at least one component independently selected from the group consisting of buffers, biocides, and metal chelators; and
   from about 0.1 to about 5 wt % of at least one dye.

2. The ink-jet ink of claim 1 wherein said at least one diol is 1,2-hexanediol.

3. The ink-jet ink of claim 1 wherein said at least one non-ionic surfactant is selected from the group consisting of secondary alcohol ethoxylate surfactants predominantly having about 4 to about 8 ethoxylated units and an aliphatic chain from about 12 to about 18 carbon atoms, non-ionic fluoro surfactants, fatty acid ethoxylate surfactants, fatty amide ethoxylate surfactants, and mixtures thereof.

4. The ink-jet ink of claim 1 wherein
   said at least one surfactant comprises a secondary alcohol ethoxylate surfactant predominantly having about 5 to about 7 ethoxylated units and an aliphatic chain from about 14 to about 16 carbon atoms.

5. The ink-jet ink of claim 1 wherein
   said at least one surfactant comprises a secondary alcohol ethoxylate surfactant predominantly having about 5 ethoxylated units and an aliphatic chain of about 15 carbon atoms.

6. The ink-jet ink of claim 1 wherein
   said at least one diol is present in an amount from about 8 to about 13 wt %; and
   said at least one surfactant is present in an amount from about 0.5 to about 1.5 wt %.

7. The ink-jet ink of claim 1 wherein said at least one alcohol is n-butanol.

8. The ink-jet ink of claim 2 wherein
   said at least one surfactant comprises a secondary alcohol ethoxylate surfactant predominantly having about 5 to about 7 ethoxylated units and an aliphatic chain from about 14 to about 16 carbon atoms.

9. The ink-jet ink of claim 8 wherein said at least one alcohol is n-butanol.

10. The ink-jet ink of claim 8 wherein
    said at least one diol is present in an amount from about 9 to about 11 wt %; and
    said at least one surfactant is present in an amount from about 0.8 to about 1.5 wt %.

11. The ink-jet ink of claim 8 wherein said at least one alcohol is present in an amount from about 1 to about 5 wt %.

12. The ink-jet ink of claim 8 wherein said at least one alcohol is present in an amount from about 1 to about 3 wt %.

13. The ink-jet ink of claim 1 wherein said at least one component independently selected from the group consisting of buffers, biocides, and metal chelators is present in amount from about 0.1 to about 0.5 wt %.

14. The ink-jet ink of claim 1 wherein the pH is in the range from 3 to about 9.

15. The ink-jet ink of claim 1 wherein the pH is in the range from 6.5 to about 8.

16. The ink-jet ink of claim 1 wherein said at least one dye is selected from the group consisting of Direct Blue 199, Yellow 104, and Magenta 377.

17. The ink-jet ink of claim 8 wherein said at least one dye is selected from the group consisting of Direct Blue 199, Yellow 104, and Magenta 377.

18. A method for ink-jet printing, said method comprising the steps of ejecting ink, said ink, comprising:
    about 8 to about 20 wt % of a diol, said diol selected from the group consisting of 1,2-pentanediol, 1,2-hexanediol, and mixtures thereof;
    about 0.1 to about 5 wt % of at least one non-ionic surfactant;
    0 to about 5 wt % of at least one alcohol independently selected from the group consisting of propanol, butanol, pentanol, hexanol, and isomers thereof;
    0 to about 1.5 wt % of at least one component independently selected from the group consisting of buffers, biocides, and metal chelators; and
    from about 0.1 to about 5 wt % of at least one dye.

19. The ink-jet printing method of claim 18 wherein said at least one diol is 1,2-hexanediol.

20. The ink-jet printing method of claim 18 wherein said at least one non-ionic surfactant is selected from the group consisting of secondary alcohol ethoxylate surfactants predominantly having about 4 to about 8 ethoxylated units and an aliphatic chain from about 12 to about 18 carbon atoms, non-ionic fluoro surfactants, fatty acid ethoxylate surfactants, fatty amide ethoxylate surfactants, and mixtures thereof.

21. The ink-jet printing method of claim 18 wherein
    said at least one surfactant comprises a secondary alcohol ethoxylate surfactant predominantly having about 5 to about 7 ethoxylated units and an aliphatic chain from about 14 to about 16 carbon atoms.

22. The ink-jet printing method of claim 18 wherein
    said at least one surfactant comprises a secondary alcohol ethoxylate surfactant predominantly having about 5 ethoxylated units and an aliphatic chain of about 15 carbon atoms.

23. The ink-jet printing method of claim 18 wherein said at least one diol is present in an amount from about 8 to about 13 wt %; and said at least one surfactant is present in an amount from about 0.5 to about 1.5 wt %.

24. The ink-jet printing method of claim 18 wherein said at least one alcohol is n-butanol.

25. The ink-jet printing method of claim 19 wherein said at least one surfactant comprises a secondary alcohol ethoxylate surfactant predominantly having about 5 to about 7 ethoxylated units and an aliphatic chain from about 14 to about 16 carbon atoms.

26. The ink-jet printing method of claim 25 wherein said at least one alcohol is n-butanol.

27. The ink-jet printing method of claim 25 wherein said at least one diol is present in an amount from about 9 to about 11 wt %; and said at least one surfactant is present in an amount from about 0.8 to about 1.5 wt %.

28. The ink-jet printing method of claim 25 wherein said at least one alcohol is present in an amount from about 1 to about 5 wt %.

29. The ink-jet printing method of claim 25 wherein said at least one alcohol is present in an amount from about 1 to about 3 wt %.

30. The ink-jet printing method of claim 25 wherein said at least one component independently selected from the group consisting of buffers, biocides, and metal chelators is present in amount from about 0.1 to about 0.5 wt %.

31. The ink-jet printing method of claim 18 wherein the pH is in the range from 3 to about 9.

32. The ink-jet printing method of claim 18 wherein the pH is in the range from 6.5 to about 8.

33. The ink-jet printing method of claim 18 wherein said at least one dye is selected from the group consisting of Direct Blue 199, Yellow 104, and Magenta 377.

34. The ink-jet printing method of claim 25 wherein said at least one dye is selected from the group consisting of Direct Blue 199, Yellow 104, and Magenta 377.

* * * * *

UNITED STATES PATENT AND TRADEMARK OFFICE
CERTIFICATE OF CORRECTION

PATENT NO. : 5,788,754
DATED : August 4, 1998
INVENTOR(S) : Larrie A. Deardurff et al.

It is certified that error appears in the above-identified patent and that said Letters Patent is hereby corrected as shown below:

Column 8, line 48 of Example 2, delete "MBS" insert --MES-- .

Signed and Sealed this

Eighth Day of June, 1999

Q. TODD DICKINSON

*Attest:*

*Attesting Officer*     Acting Commissioner of Patents and Trademarks